US006870480B2

(12) United States Patent
Suzuki et al.

(10) Patent No.: US 6,870,480 B2
(45) Date of Patent: Mar. 22, 2005

(54) MAINTENANCE SERVICE SYSTEM FOR HOME ELECTRIC APPLIANCES

(75) Inventors: Hideaki Suzuki, Hitachi (JP); Chihiro Fukui, Hitachinaka (JP); Masayuki Tani, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 73 days.

(21) Appl. No.: 10/079,503

(22) Filed: Feb. 22, 2002

(65) Prior Publication Data

US 2002/0130784 A1 Sep. 19, 2002

(30) Foreign Application Priority Data

Mar. 16, 2001 (JP) ...................................... 2001-077021

(51) Int. Cl.[7] ................................................ G08B 21/00
(52) U.S. Cl. ....................... 340/679; 340/540; 340/531; 379/106.01
(58) Field of Search ................................ 340/679, 683, 340/665, 540, 531, 635; 361/23; 318/471, 473, 490; 702/56, 132; 379/106.01, 102.01, 102.04, 102.07

(56) References Cited

U.S. PATENT DOCUMENTS

| | | | | | |
|---|---|---|---|---|---|
| 4,916,439 | A | * | 4/1990 | Estes et al. | 340/679 |
| 5,506,892 | A | * | 4/1996 | Kojima et al. | 379/102 |
| 5,987,105 | A | * | 11/1999 | Jenkins et al. | 379/106.01 |
| 6,021,324 | A | * | 2/2000 | Sizer et al. | 455/403 |
| 6,297,742 | B1 | * | 10/2001 | Canada | 340/635 |

FOREIGN PATENT DOCUMENTS

| | | |
|---|---|---|
| JP | 10-260866 | 9/1998 |
| JP | 2000-196769 | 7/2000 |

* cited by examiner

*Primary Examiner*—Anh V. La
(74) *Attorney, Agent, or Firm*—Dickstein Shapiro Morin & Oshinsky LLP

(57) ABSTRACT

A maintenance service system for home electric appliances is disclosed which comprises a home electric appliance, a portable terminal which can communicate with the home electric appliance and an information providing server which can communicate with the portable terminal.

11 Claims, 10 Drawing Sheets

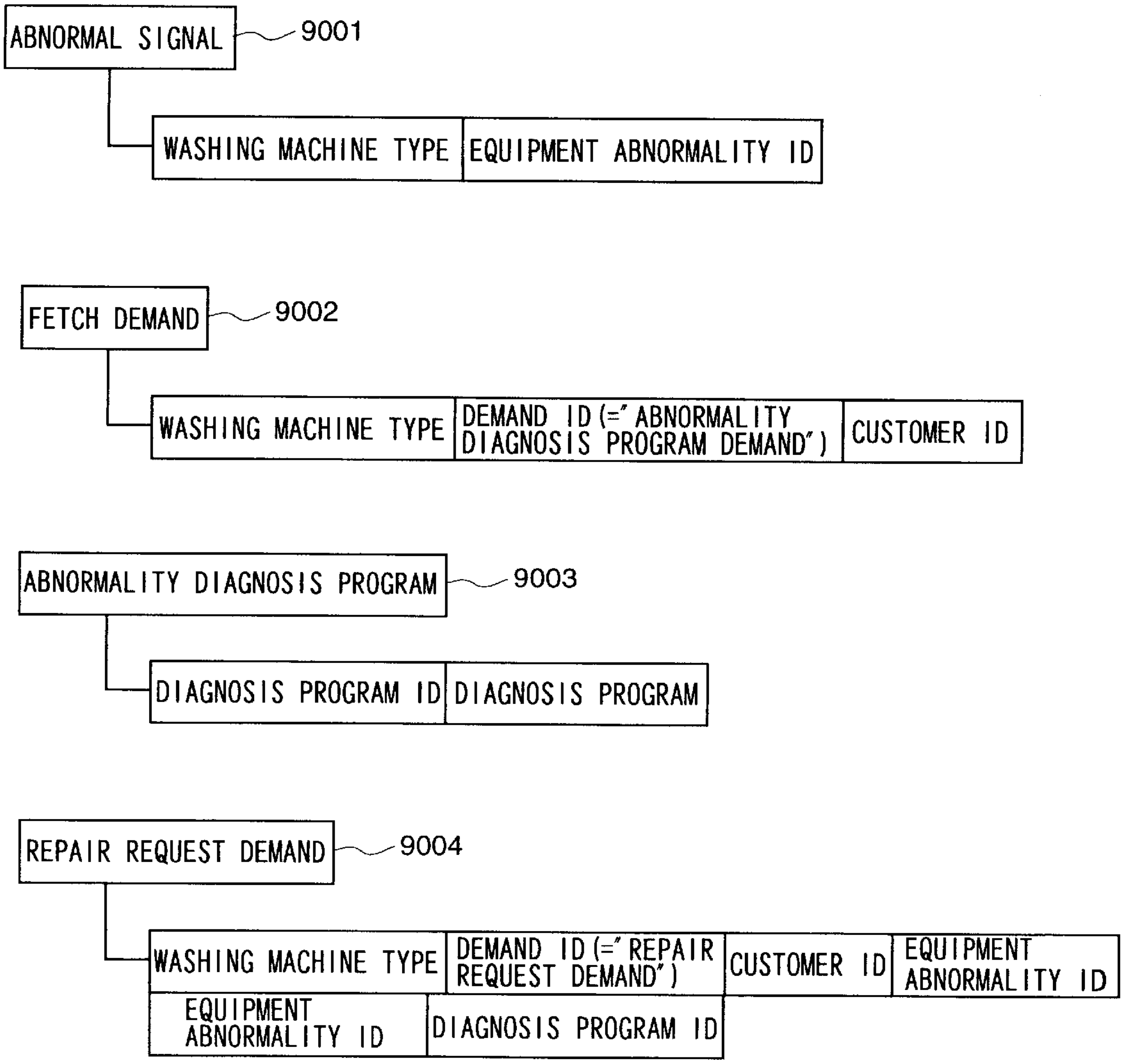

FIG. 12

ABNORMAL SIGNAL — 9001
| WASHING MACHINE TYPE | EQUIPMENT ABNORMALITY ID |

FETCH DEMAND — 9002
| WASHING MACHINE TYPE | DEMAND ID (="ABNORMALITY DIAGNOSIS PROGRAM DEMAND") | CUSTOMER ID |

ABNORMALITY DIAGNOSIS PROGRAM — 9003
| DIAGNOSIS PROGRAM ID | DIAGNOSIS PROGRAM |

REPAIR REQUEST DEMAND — 9004
| WASHING MACHINE TYPE | DEMAND ID (="REPAIR REQUEST DEMAND") | CUSTOMER ID | EQUIPMENT ABNORMALITY ID |
| EQUIPMENT ABNORMALITY ID | DIAGNOSIS PROGRAM ID | | |

MAINTENANCE SERVICE SYSTEM FOR HOME ELECTRIC APPLIANCES

BACKGROUND OF THE INVENTION

The present invention relates to a maintenance service system for home electric appliances which maintains and serves home electric appliances.

The maintenance service system for home electric appliances described in the Japanese Patent Application Laid-Open No. 2000-196769 and Japanese Patent Application Laid-Open No. 10-260866 notifies unnecessarily by the user of home electric appliances by detecting the failure of a home electric appliance, and notifying the maintenance service center automatically.

However, said prior art needs an own failure diagnosis means built into the home electric appliance. Therefore, it is not possible to cope with the failure where said own failure diagnosis means is not built in the home electric appliance or the failure cannot be detected by said own failure diagnosis means.

Further, the information providing which enables a selection as to whether a repair is required by the user of the home electric appliance is not considered. Therefore, it is not possible to meet the demand of a repair according to the necessity.

SUMMARY OF THE INVENTION

An object of the present invention is to provide the reduction of time when the donor of maintenance service for home electric appliances proceeds to the actual place for abnormality diagnosing.

Another object of the present invention is to provide the reduction of the load of services such as regular checks to a home electric appliance.

Another object of the present invention is to provide a maintenance service system which can cope with various malfunctions of the home electric appliance.

Another object of the present invention is to provide a maintenance service system with an easy abnormality diagnosis to the home electric appliance without a malfunction detection means.

Another object of the present invention is to provide a maintenance service system which can facilitate operating for the home electric appliance after the user of the home electric appliance performed a return process for the home electric appliance.

Another object of the present invention is to provide a maintenance service system from which the user of the home electric appliance can obtain information to judge whether to repair.

Another object of the present invention is to provide a maintenance service system from which the user of the home electric appliance can obtain information for buying a home electric appliance.

Another object of the present invention is to provide a maintenance service system which can provide information which supports the judgment of a repair or buying to the user of the home electric appliance.

Another object of the present invention is to provide a maintenance service system which can plan maintenance by the provider of maintenance service in the form along the hope of the user of the home electric appliance.

Another object of the present invention is to provide there is a problem in the power circuit of home electric appliances, and the maintenance service system which can notify the malfunction.

Another object is to provide a maintenance service system which can easily select an equipment which the user of the home electric appliance who maintains the home electric appliance makes a maintenance object.

Another object of the present invention is to provide a maintenance service system giving the easy return by the user oneself of the home electric appliance of the home electric appliance from abnormal state.

Another object of the present invention is to provide a maintenance service system which can do abnormality diagnosing, even when it is not possible to communicate with the information providing server.

The present invention is characterized by the provision of a home electric appliance, a portable terminal which can communicate with said home electric appliance and an information providing server which can communicate with said portable terminal.

As a characteristic feature of the present invention, said home electric appliance notifies said portable terminal a malfunction at the time of malfunction detection.

Also, as a characteristic feature of the present invention, said portable terminal, when it is notified the malfunction from said home electric appliance or the operator of said portable terminal requests, receives an abnormality diagnosing program executed in said portable terminal from said information providing server, and, as a result, executes said abnormality diagnosing of said home electric appliances, whereby the result of the abnormality diagnosing is displayed in the portable terminal.

Further, as a characteristic feature of the present invention, said abnormality diagnosing program carries out a question concerning the malfunction judgment of said home electric appliance to the operator of said portable terminal and notify the information providing server the response result from said operator or maintain said response result in the said portable terminal.

Further, as a characteristic feature of the present invention, said abnormality diagnosing program, according to the response result from said operator, transmits a control signal to continue the interrupted processing to said home electric appliance.

Further, as a characteristic feature of the present invention, according to the result of the abnormality diagnosing of the abnormality diagnosing program, when repair is needed for said home electric appliance, the estimate of the content of the repair and repair cost is displayed on said portable terminal.

Further, as a characteristic feature of the present, the estimated amount of said repair cost is larger than the specified value specified by the operator of said portable terminal or the administrator of or said information providing server or the developer of said abnormality diagnosing program, information on buying said home electric appliance can be acquired according to the demand of the operator of said portable terminal.

Further, as a characteristic feature of the present, by comparing the repair fee and the market value of said home electric appliance with the market value of a new home electric appliance having the similar function to said home electric appliance, information on the buying of said new home electric appliance can be acquired.

Further, as a characteristic feature of the present, depending upon the result of the abnormality diagnosis by said abnormality diagnosing program, in case where a repair should be needed for said home electric appliance, the date when said home electric appliance is repaired is specified by the operator of said portable terminal and it is notified to said information providing server.

Further, as a characteristic feature of the present, said home electric appliance has a standby power source as used to notify said portable terminal a malfunction.

Further, as a characteristic feature of the present, when the failure diagnosis of said home electric appliance is carried out by the failure diagnosis program according to the demand of the operator of said portable terminal, the candidate of a home electric appliance which becomes an object is displayed on said portable terminal, said candidate being selected by priority from the near one to the operator of said portable terminal spatially.

Further, as a characteristic feature of the present, after the malfunction of said home electric appliance is detected, the return method for it is displayed on said portable terminal.

Further, as a characteristic feature of the present, said portable terminal receives the failure diagnosis program from said home electric appliance.

BRIEF DESCRIPTION OF THE DRAWINGS

FIG. 12 is a view where the data organization used in the embodiment shown in FIG. 2.

DETAILED DESCRIPTION OF THE PREFERRED EMBODIMENTS

Hereafter, the embodiment of the present invention is explained with reference to FIGS. 1–10.

Figure 1:
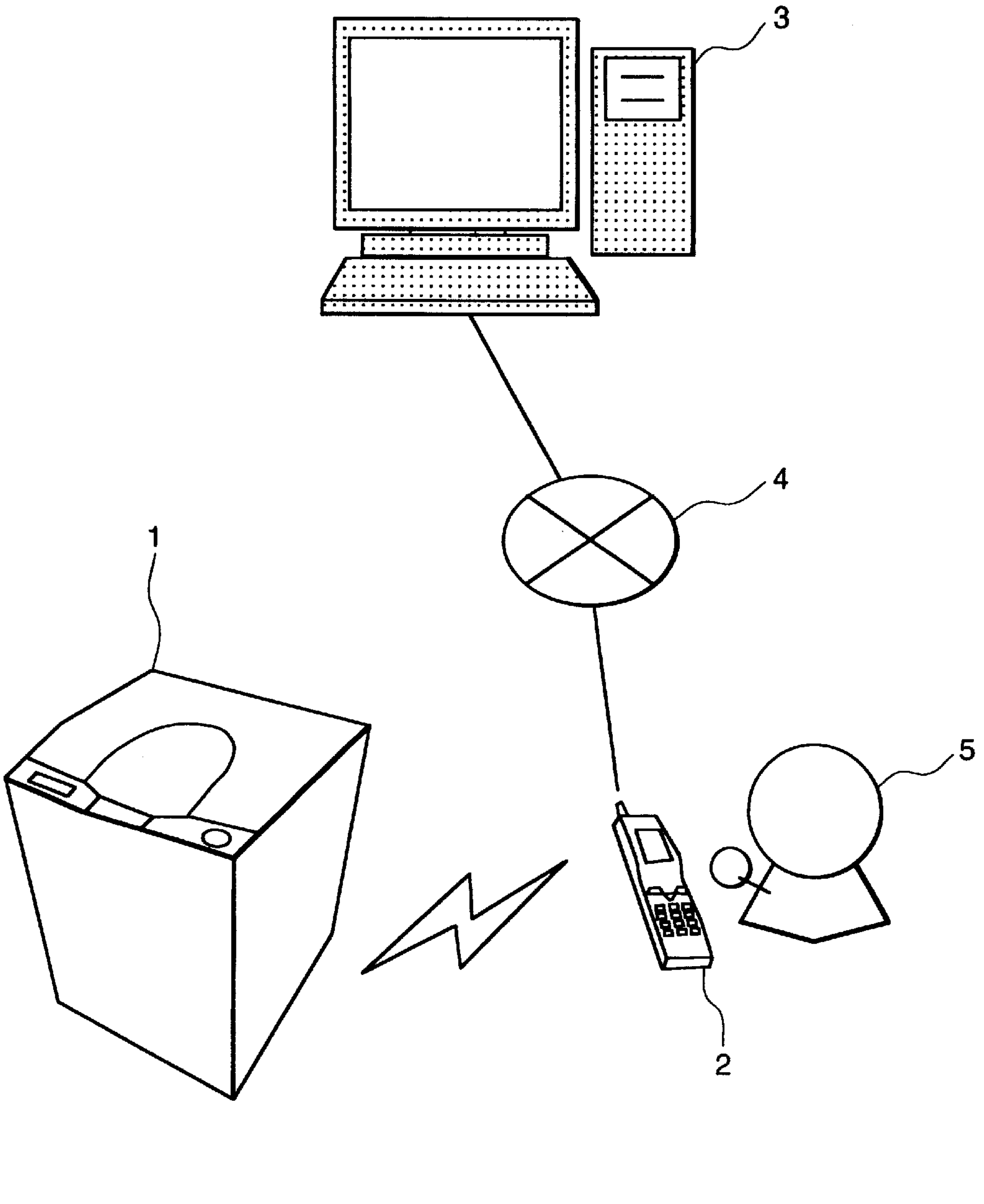
FIG. 1 is a block diagram showing the whole maintenance service system for home electric appliances according to one embodiment of the present invention.

FIG. 1 is a block diagram showing the whole structure of a maintenance service system for a home electric appliance according to this embodiment.

The maintenance service system for the home electric appliance according to this embodiment is composed by a washing machine 1, a portable terminal 2 which is a portable terminal such as a portable telephone set the like, an information providing server 3 which processes maintenance information for home electric appliances, and a networks 4 of a public telephone line, or the Internet, etc. Further, a user 5 who uses this system exists.

The washing machine 1 and the portable terminal 2 can communicate mutually through a cable or short distance radio communication (for instance, Bluetooth standard). Further, the portable terminal 2 and the information providing server 3 are connected through the network 4, and can transfer information mutually. Though the washing machine 1 is illustrated as an example of the home electric appliance in this embodiment, it may be substitution with at least one of an air conditioner, a refrigerator, a cleaner, a microwave oven, a television set, a video deck, and a stereo set, etc. or a combination may be used.

Figure 2:
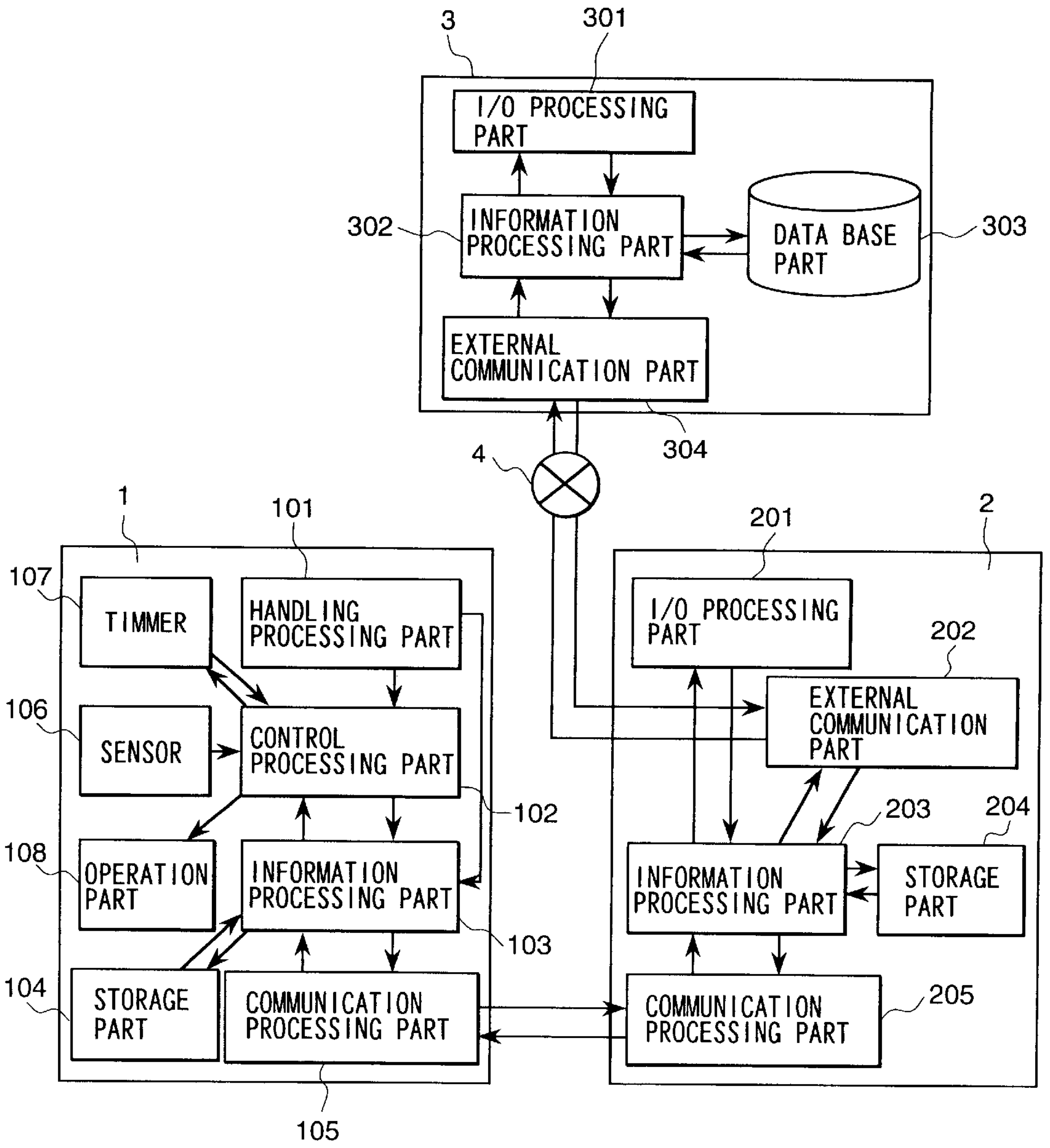
FIG. 2 is a block diagram showing the internal configuration of the washing machine, the portable terminal, and the information providing server which composes the maintenance service system for home electric appliances in the embodiment shown in FIG. 1.

FIG. 2 is a block diagram showing an internal construction of the washing machine 1, portable terminal 2 and information providing server 3 constituting the KHS according to this embodiment.

The washing machine 1 comprises an operation processing part 101 including a handling panel which is handled by the user who uses the washing machine 1, said operation processing part processing operation signals from the handling panel, a control processing part 102 receiving the handling signals from said operation processing part 101 and controlling a washing operating part 108, a sensor 106 and timer 107 which are needed to carry out the washing operation, an information processing part 103 processing various information, memory part 104 holding said information and a communication processing part 105 for communication with the portable terminal 2.

The portable terminal 2 comprises an input output processing part 201 including a handling panel handled by the user 5 who uses it and a display part, said input output processing part processing handling signals and displaying various information, an outside communication part 202 communicating with the information providing server 3, an information processing part 203 processing various information, a memory part 204 holding said information, and an information processing part 205 communicating with the washing machine 1.

The information providing server 3 comprises input output processing part 301 including a handling panel handled by an administrator who administrate it and a display part, said input output processing part receiving handling inputs and displaying and outputting various information, an information processing part 302 processing the various information, a database part 303 holding various data, and an outside information part 304 for communicating with the portable terminal 2 through the network 4.

In this KHS, the washing machine 1 receives signals representing of the operations performed by the user as the operation signals from the operation processing part 101. The operation processing part 101 transmits the operation signals to the control processing part 102 and the information processing part 103. The control processing part 102 delivers to the washing operating part 108 control signals for executing the washing according to the received operation signals. In operation, the sensor 106 and the timer 107 manage the operation status of the washing operating part 108, and it is held in the inside of the control processing part 102.

Figure 10:
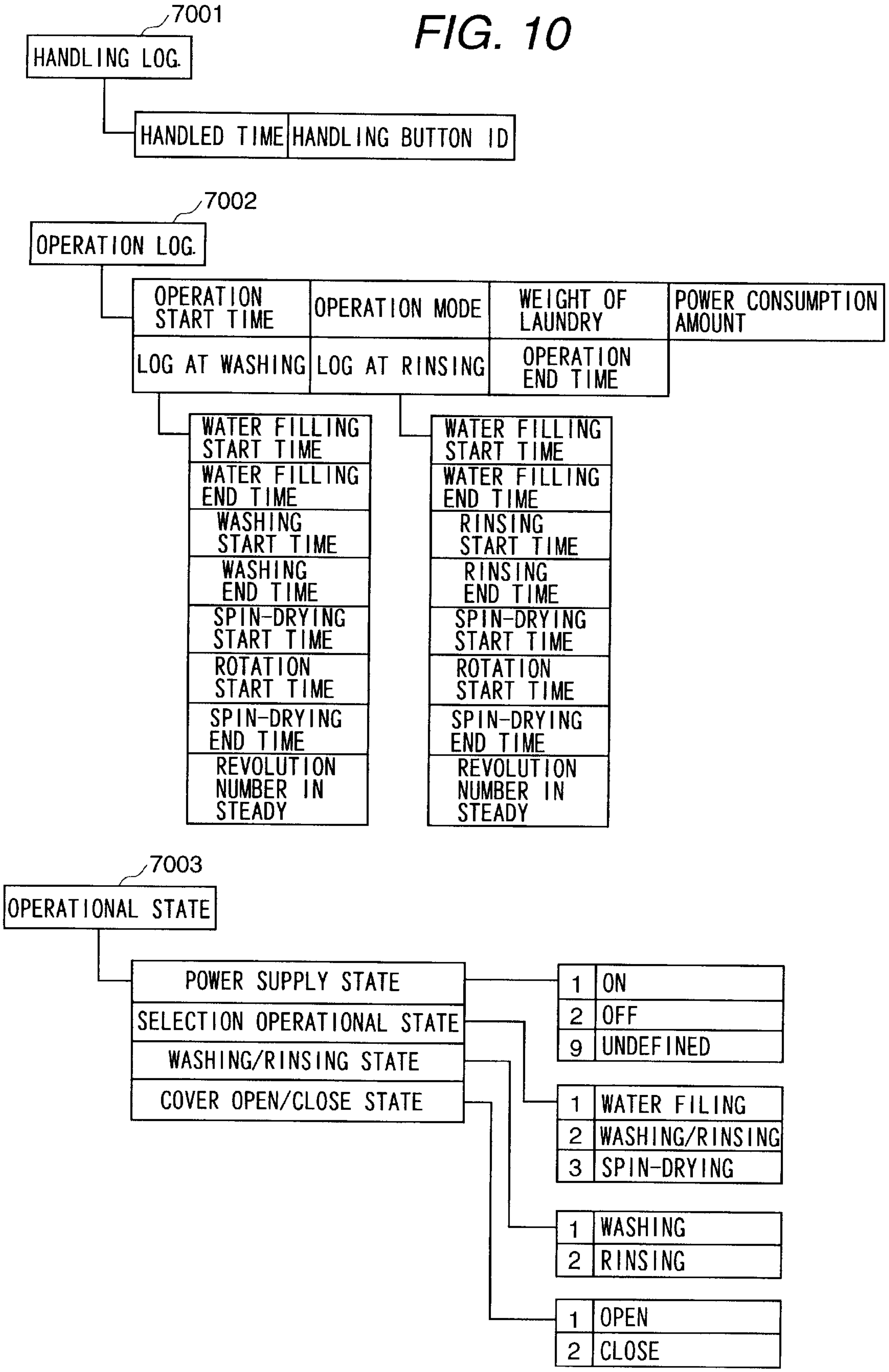
FIG. 10 is a view where the data organization used in the embodiment shown in FIG. 2.

The information processing part 103 receives the operation signals from the operation processing part 101 and the operation status from the control processing part 102, and causes them to be held in the memory part 104 as handling logs and operation logs. The example of the contents of these handling and operation logs is shown in FIG. 10. The information processing part 103, further, transmits the information held in the memory part 104 to the portable terminal 2 through the communication processing part 105, in response to a request from the portable terminal 2.

Also, the control processing part 102, if it judges a status which was not supposed by the user, transmits it to the portable terminal 2 through the communication processing part 105 as an abnormal signal. The contents of the operation status of the washing machine 1 are exemplified in FIG. 10.

The portable terminal 2, when it receives the abnormal signal from the washing machine 1 through the communication processing part 105 and communication processing part 205, checks the received abnormal signal in the information processing part 203, and whereby it transmits the request signal of an abnormality diagnosing program from the outside communicating part 202 through the network 4 to the information providing server 3.

The information providing server 3 retrieves an abnormality diagnosing program corresponding to the received abnormality diagnosing program request signal from the database part 303 by means of the information processing part 302, and transmits it from the outside communicating part 304 to the portable terminal 2 through the network 4.

The portable terminal 2, when it receives the abnormality diagnosing program from the information providing server 3 through the outside communicating part 202, holds it in the memory part 204.

The information processing part 203 reads the received abnormality diagnosing program held in the memory 204, from the memory 204 and executes it, transmits an identification signal for performing the status identification of the washing machine 1 to the washing machine 1 through the communication processing part 205, receives, in response thereto, the handling log and operation log which have been held in the memory 104 of the washing machine, and carries out the failure diagnosis based thereupon. Further, the abnormality diagnosing program receives the response from the user through the I/O processing part 201, collects the information on the abnormality diagnosis, and carries out the abnormality diagnosis based thereupon. As a result, when the washing machine 1 seems to be abnormal, the content of failure of the device and the repair estimation are output through the I/O processing part 201. As the response, the repair request and the desired date for the repair are received.

The information processing part 203 transmits this repair request and the repair desired date from an external communication part 202 to information providing server 3 as a repair-request demand through network 4.

The information providing server 3 maintains the repair-request demand received by the information processing part 302 in data base part 303. Afterwards, the arrangement of maintenance service is executed by the manager of the information providing server 3 which confirms information through I/O operation part 301.

FIGS. 3–5 and FIG. 13 illustrate the transition of display screen of portable terminal 2 at maintenance service.

Figure 3:
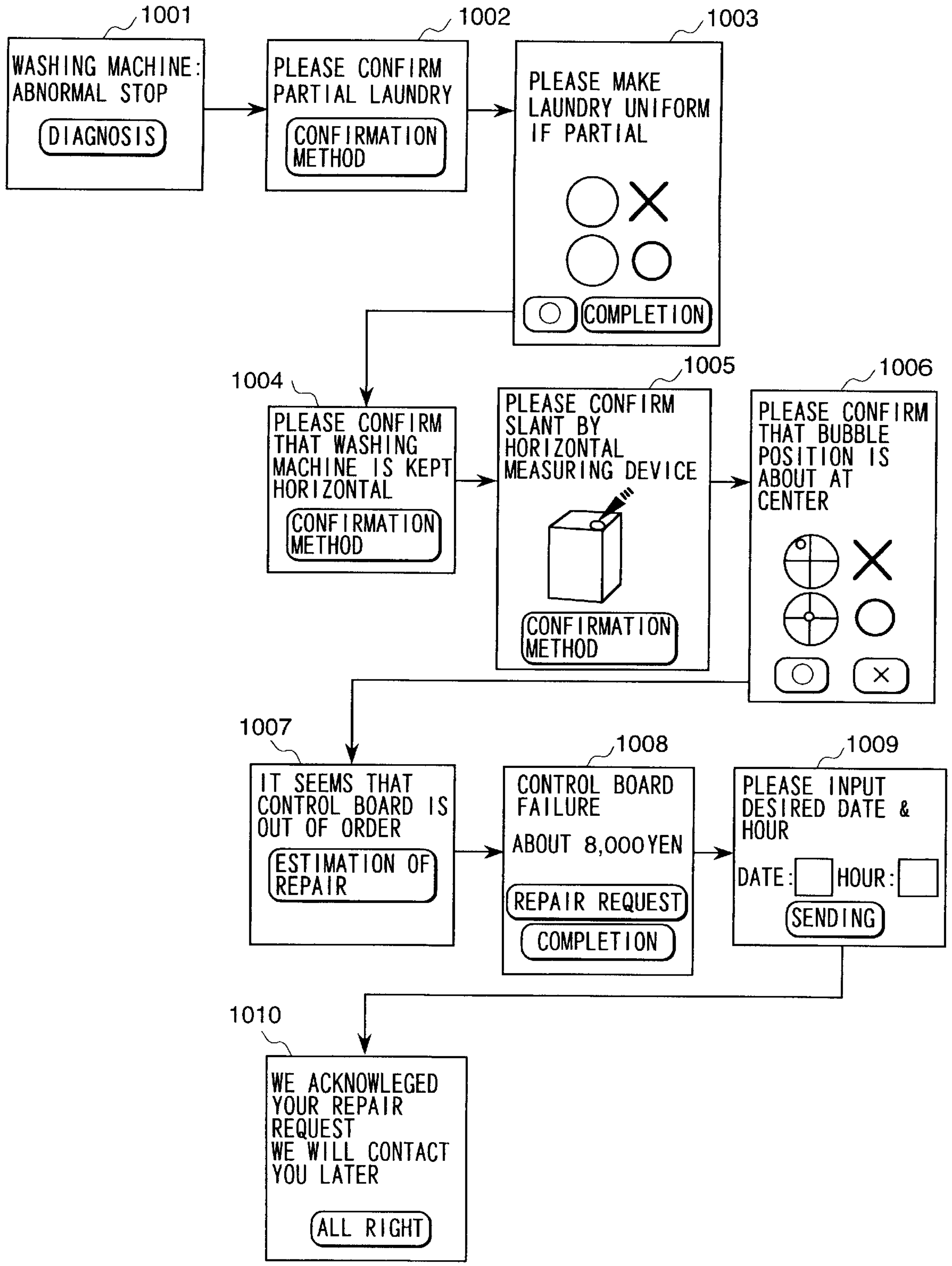
FIG. 3 is an example of the display screen of the portable terminal in the procedure to request the repair by the portable terminal in the embodiment shown in FIG. 2.

FIG. 3 shows the example of display screen of the portable terminal 2 which shows the procedure that the repair of washing machine 1 is requested after abnormal diagnosis is done by portable terminal 2 using the abnormal diagnosis program with washing machine 1 stopped by malfunction detection.

Screen 1001 shows the screen of portable terminal 2 when information processing part 203 displays by I/O operation part 201 by this malfunction signal, in which control processing part 102 of washing machine 1 detects the malfunction, and the malfunction signal (this malfunction signal is maintained in storage part 204) is notified to portable terminal 2 through information processing part 103 and communication processing part 105.

User 5 selects "Diagnosis" by which the diagnosis of the equipment is demanded after this display is confirmed from the screen. When this "Diagnosis" is selected, information processing part 203 transmits an acquisition request of the abnormal diagnosis program to do the diagnosis to information providing server 3 based on the malfunction signal received from washing machine 1. The content of said malfunction signal, said acquisition request, and the said abnormal diagnosis program is illustrated in the FIG. 12.

The information processing part 203 of portable terminal 2 receives the abnormal diagnosis program, stores in storage part 204, and executes the diagnosis. In this diagnosis, the abnormal diagnosis program takes the malfunction signal out of the memory part 204 and executes the diagnosis of the content of the malfunction based on malfunction ID.

The screen 1002 is a screen displayed first based on malfunction ID. User 5 confirms the bias condition of laundry in washing machine 1 according to the content of screen 1002. Instruction button "confirmation method" to confirm the confirmation method of bias of laundry is displayed on screen 1002. The screen 1003 is displayed when user 5 directs this "Confirmation method".

The screen 1003 is displayed by using the pictures showing the examples of the quality of bias of laundry. Here, there is no bias in laundry, and is no problem. Therefore, screen 1004 is displayed when assuming that user 5 selected "○", and the content of the following confirmation is displayed.

The screen 1004 is a screen to confirm whether washing machine 1 is kept horizontal. When user 5 directs "Confirmation method", screen 1005 is displayed.

The screen 1005 displays that a horizontal measuring device is needed to confirm, and the position of the horizontal measuring device is picturized. In addition, when user 5 directs "Confirmation method" on screen 1005, screen 1006 is displayed.

The confirmation method with the horizontal measuring device is displayed on screen 1006. Here, the state of the horizontal measuring device becomes like "○", and screen 1007 is displayed when assuming that user 5 selected "○".

The screen 1007 displays the content of the failure and "Repair estimation". When "Repair estimation" is directed here, screen 1008 is displayed.

The repair part, the estimation of the repair cost and "Repair request" are displayed on screen 1008. Here, screen 1009 is displayed when assuming that user 5 selected "Repair request" further.

The screen 1009 displays the screen to input the expected date when the repair is executed. When user 5 inputs the expected date and hours and directs "transmission", portable terminal 2 transmits the repair request demand from an external communication part 202 to information providing server 3 through network 4. When information providing server 3 (a manager or a serviceman) acknowledges this repair request, and replies the acknowledgement to portable terminal 2, screen 1010 is displayed.

The screen 1010 displays the acceptance of the repair request. The content of the repair request demand is as shown in FIG. 12.

Figure 4:
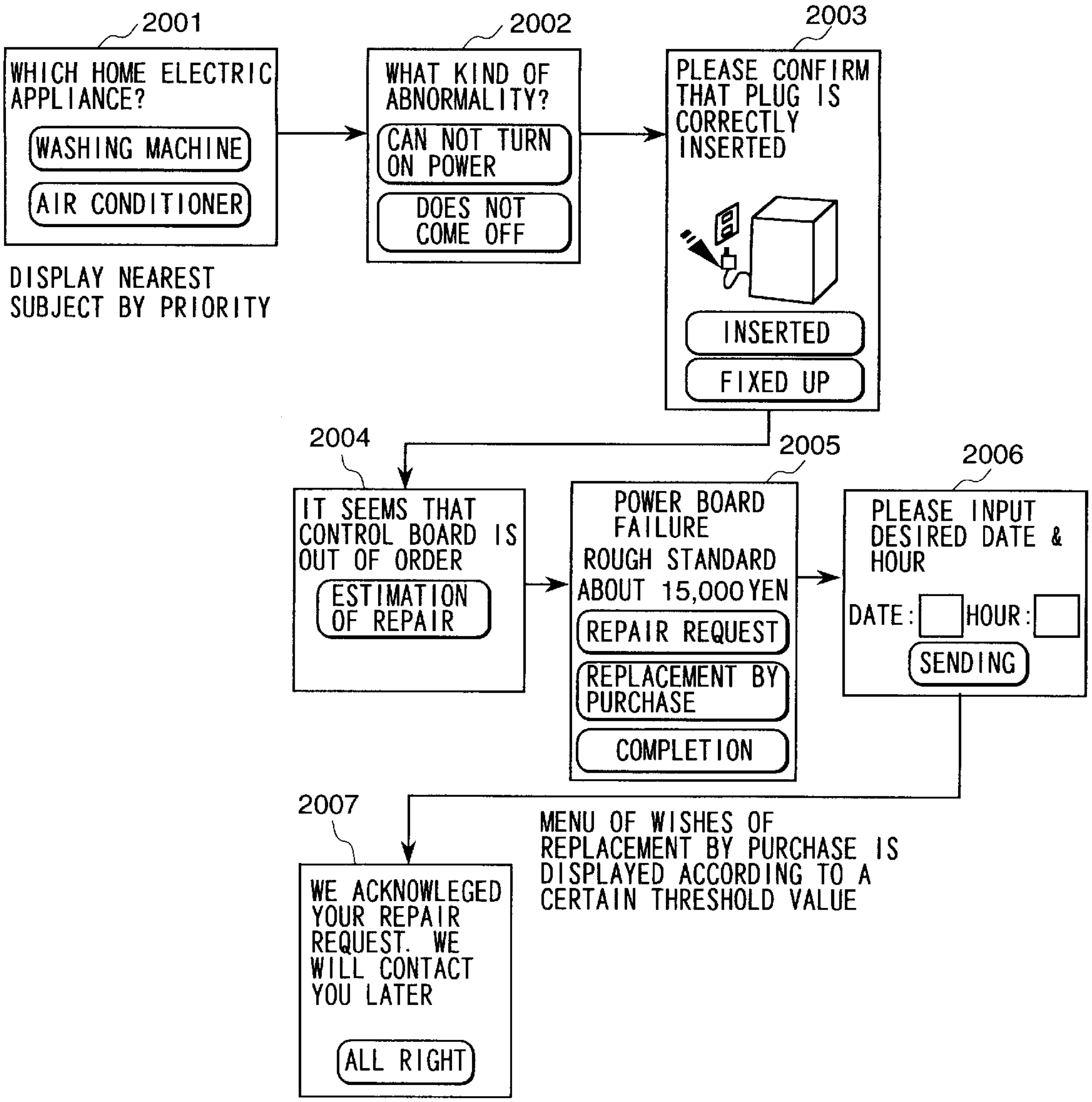
FIG. 4 is an example of the display screen of the portable terminal in the procedure to request the repair or replace by purchase by the portable terminal in the embodiment shown in FIG. 2.
Figure 13:
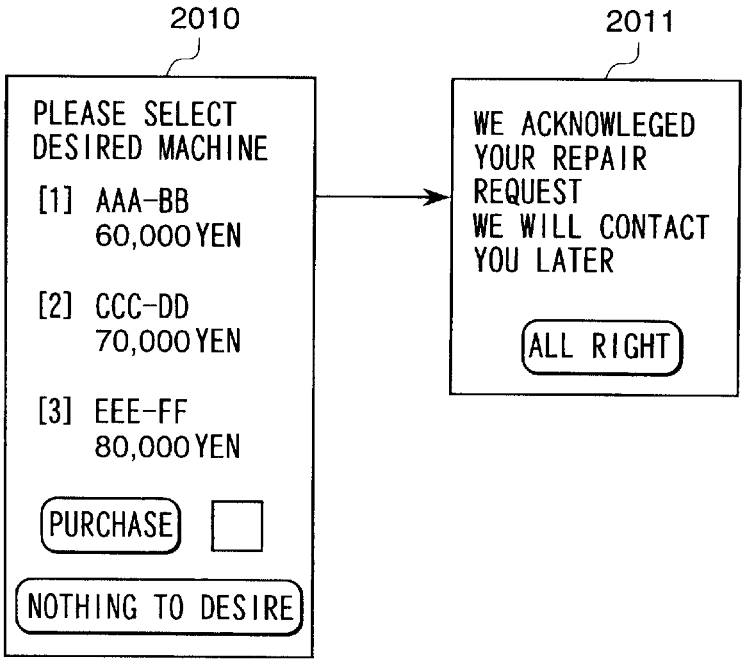
FIG. 13 is an example of the display screen of the portable terminal in the procedure of the replacement by purchase of the washing machine in the embodiment shown in FIG. 2.

FIGS. 4 and 13 are examples of the display screen of portable terminal 2, showing the procedure by which the repair of washing machine 1 or the replacement is requested after the abnormal diagnosis is performed by using the abnormal diagnosis program according to the request of user 5.

The screen 2001 is a screen displayed according to the demand of user 5 when user 5 determines that washing machine 1 is malfunctional. Screen 2001 displays "WASHING MACHINE" and "AIR CONDITIONER" as a list of the candidate for maintenance. This list indicates by priority the home electric appliances closest to the portable terminal 2 which user 5 operates based on the response from the home electric appliances and the confirmation signal sent from portable terminal 2. As a result, the user comes to be able to select the target home electric appliance efficiently from among a lot of home electric appliances. Here, screen 2002 is displayed when assuming that user 5 selected "WASHING MACHINE" on screen 2001.

The screen 2002 displays the list of the malfunction content which inquires of what malfunction it is. Here, "CAN NOT TURN ON" and "DOES NOT COME OFF" are displayed. Here, screen 2003 is displayed when assuming that user 5 selected "CAN NOT TURN ON".

The screen 2003 displays the procedure by which the state of washing machine 1 is confirmed. Here, on screen 2003, it is demanded to confirm whether the power supply plug is neatly in the outlet. Here, the power supply plug of washing machine 1 is correctly inserted to the outlet, and screen 2004 is displayed when assuming that user 5 selected "INSERTED".

The failure is displayed on screen 2004. Here, when "ESTIMATION OF REPAIR" is selected, screen 2005 is displayed.

The screen 2005 displays the repair part and the estimation of the repair cost. Choices "REPLACEMENT BY PURCHASE" besides "REPAIR REQUEST" are displayed on this screen 2005. Buying home electric appliances is proposed to user 5 by the abnormal diagnosis program as methods other than the repair based on the calculation result obtained by comparing among prices of a new product of equal goods, the market value of washing machine 1, and the amount of the repair estimation. When choices of "REPLACEMENT BY PURCHASE" are displayed, the manager of information providing server 3 sets beforehand through I/O processing part 301. Or, user 5 can decide according to whether the amount of the repair estimation is larger than that of the value set beforehand through I/O processing part 201. Here, if user 5 desires for the request of the repair, and "REPAIR REQUEST" was selected, screen 2006 is displayed.

The screen 2006 displays the screen to set the repairing date. When "SENDING" is directed after the desire date is input, this is reported to information providing server 3. Screen 2007 is displayed after it is confirmed in information providing server 3, and it is informed that the repair request was accepted.

The screen 2010 is displayed as shown in FIG. 13 when assuming that user 5 selected "REPLACEMENT BY PURCHASE" on-screen 2005. Screen 2010 displays the list of goods substantially equal to washing machine 1. The request of purchase is notified to information providing server 3 that the favorite commercial product number is input, and "PURCHASE" is directed on this screen 2010. Information providing server 3 sends to portable terminal 2 the storage of the purchase request in data base part 303, and the acceptance of the purchase request.

Screen 2011 displays the acceptance of the purchase request by information providing server 3. Therefore, the procedure of the purchase request is completed.

Thus, user 5 becomes possible to know the cause and the corrective action method even when washing machine 1 cannot send a malfunction signal to portable terminal 2 for instance by the failure of the power circuit, etc.

Figure 5:
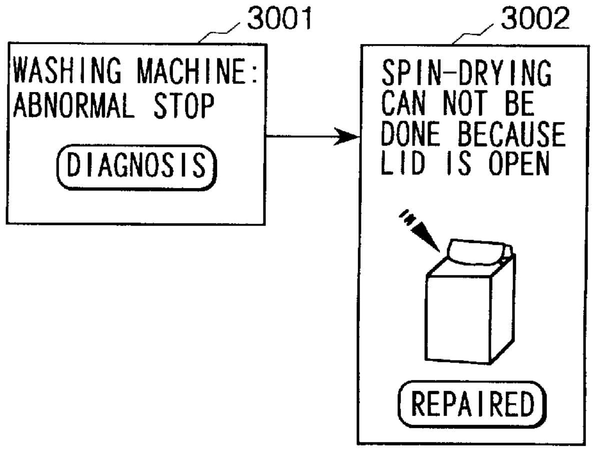
FIG. 5 is an example of the display screen of the portable terminal in the procedure by which the washing machine according to the embodiment shown in FIG. 2 is returned.

FIG. 5 is an example of display screen of portable terminal 2, which illustrates the procedure of the return of washing machine 1 after the stop of the washing machine due to the malfunction detection and the abnormal diagnosis by the abnormal diagnosis program.

Screen 3001 shows a screen displayed when washing machine 1 stops by the malfunction of washing machine 1. When user 5 directs "Diagnosis", screen 3002 is displayed.

The screen 3002 displays the stop occurred not by the breakdown of washing machine 1, but the improper operation by user 5. When User 5 closes the lid according to display, and directs "repaired", the control signal indicative of an instruction of the continuance operation of washing machine 1 is sent from the abnormal diagnosis program to communication processing part 205. This control signal is transmitted to control processing part 102 through communication processing part 105 and information processing part 103. When control processing part 102 sends the control signal to selection operation part 108, washing machine 1 restarts (continues) the washing operation.

As mentioned above, the predetermined washing operation can be restarted without restarting and operating washing machine 1 according to the instruction of portable terminal 2 when washing machine 1 is returned by user 5.

Figure 7:
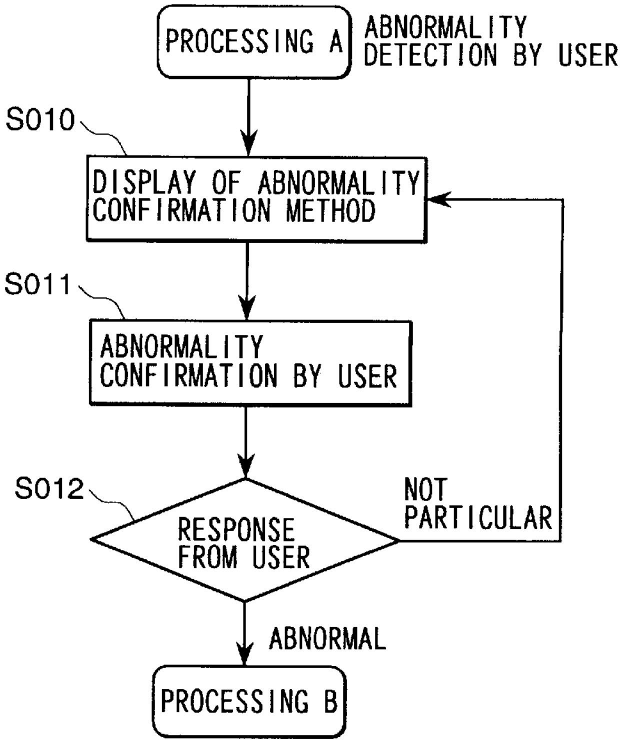
FIG. 7 is a flow chart showing the processing procedure in the embodiment shown in FIG. 2.
Figure 8:
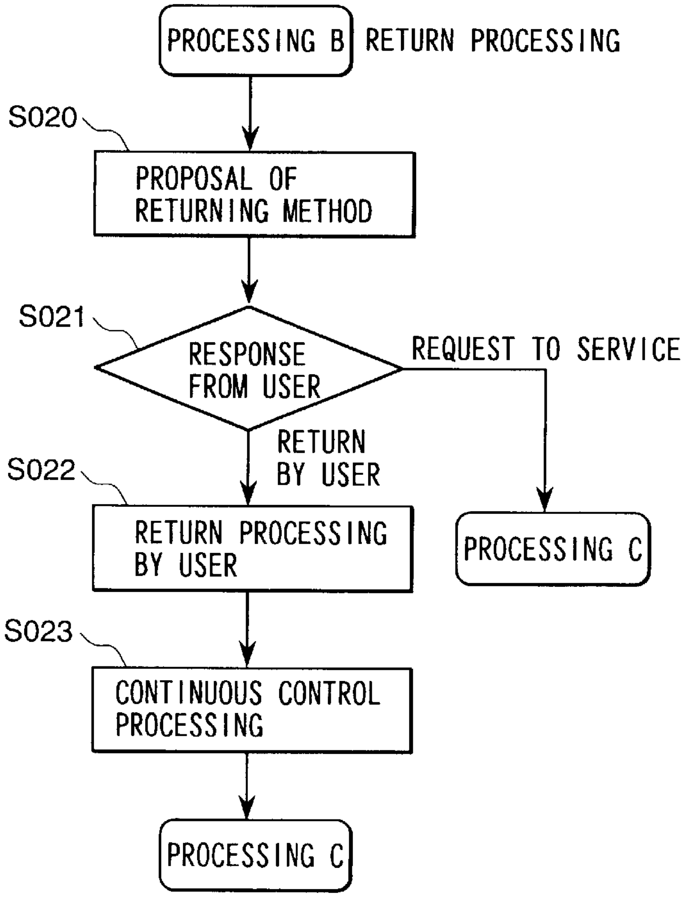
FIG. 8 is a flow chart showing the processing procedure in the embodiment shown in FIG. 2.

The flow of processing in this embodiment will be explained with reference to FIGS. 6–8.

Figure 6:
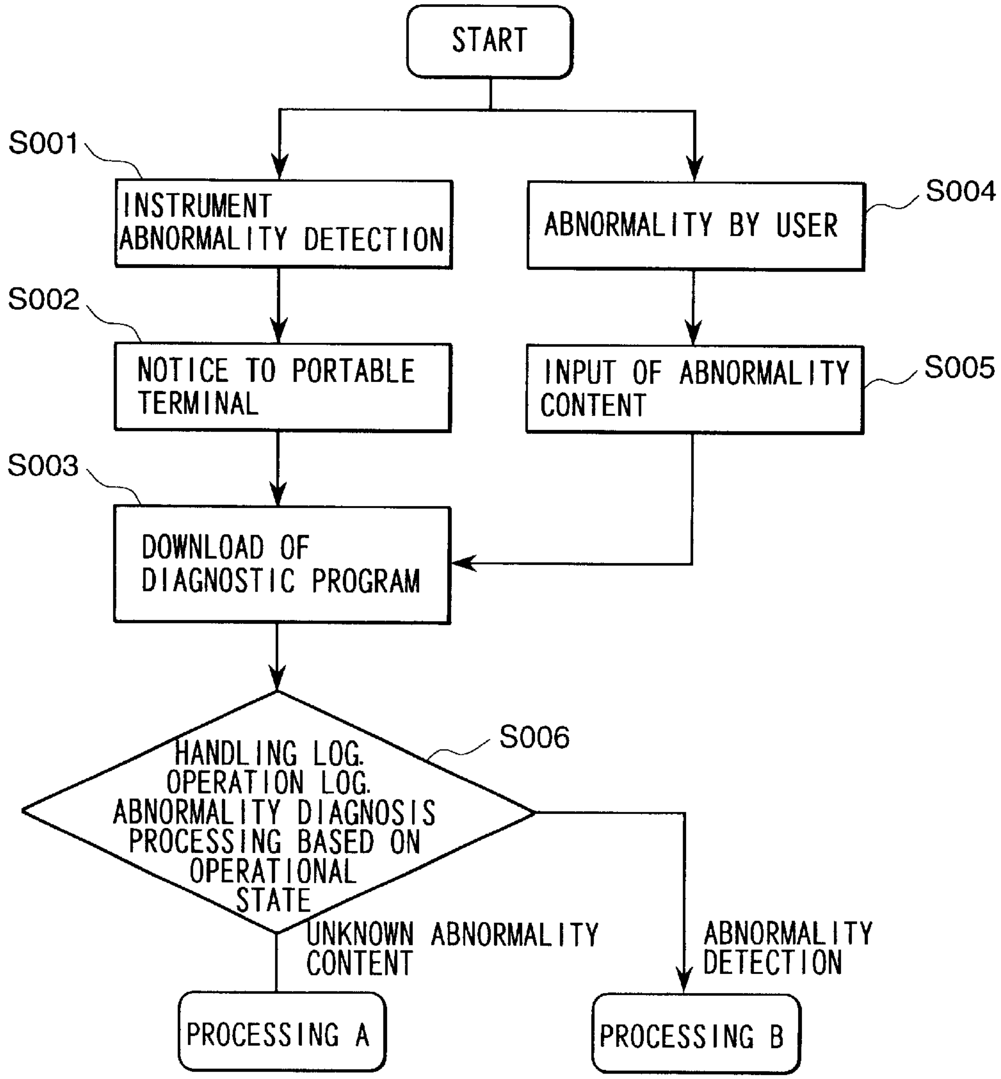
FIG. 6 is a flow chart showing the processing procedure in the embodiment shown in FIG. 2.

The diagnosis for equipment is begun in step S001 or step S004 as shown in FIG. 6.

When washing machine 1 detects the malfunction in step S001, the malfunction signal is transmitted to portable terminal 2 in step S002. As a result, portable terminal 2 acquires the abnormal diagnosis program from the information providing server 3 in step S003. Further, it is required for user 5 to input the content of the malfunction in step S005 when abnormal diagnosis of washing machine 1 is started according to the demand of the user in step S004. As a result, the abnormal diagnosis program is acquired in step S003.

Portable terminal 2 executes the abnormal diagnosis processing by using the abnormal diagnosis program in step S006 based on the operation log, the operation log, and the action state stored in memory part 104 of washing machine 1. When the abnormal diagnosis program cannot distinguish the content of the malfunction by the information of the operation log, the operation log and the action state, processing A is executed. On the other, when the content of the malfunction can be distinguished by the abnormal diagnosis program, processing B is executed.

Processing A will be explained with reference to FIG. 7. In the processing A, the malfunction of washing machine 1 is detected from the information input by user 5.

In step S010, the method of confirming the malfunction of washing machine 1 by the abnormal diagnosis program is displayed.

The confirmation of the malfunction is performed by user 5 in step S011. Then, the malfunction confirmation result is input by user 5 in step S012 through I/O processing part 201 of portable terminal 2. If the response of user 5 is "the malfunction is found", then the user input is assumed as the result of the abnormal diagnosis and processing B is executed. If the response of user 5 is "the malfunction is not found", then the processing returns to step S010 and the next malfunction confirmation processing is executed.

Next, processing B will be explained with reference to FIG. 8. In this processing B, the information on the return of home electric appliances after the malfunction is detected is presented.

The return method is presented to user 5 in step S020.

User 5 performs the return processing in step S022 when judged that the return method is acceptable for user 5 in step S022.

In step S023, the control processing for washing machine 1 to continue the operation is executed after the return processing by user 5. As a result, normal washing operation can be continued.

When judged that the return method is unacceptable for user 5 or the repair of washing machine 1 is required, processing C is executed in step S021.

Figure 9:
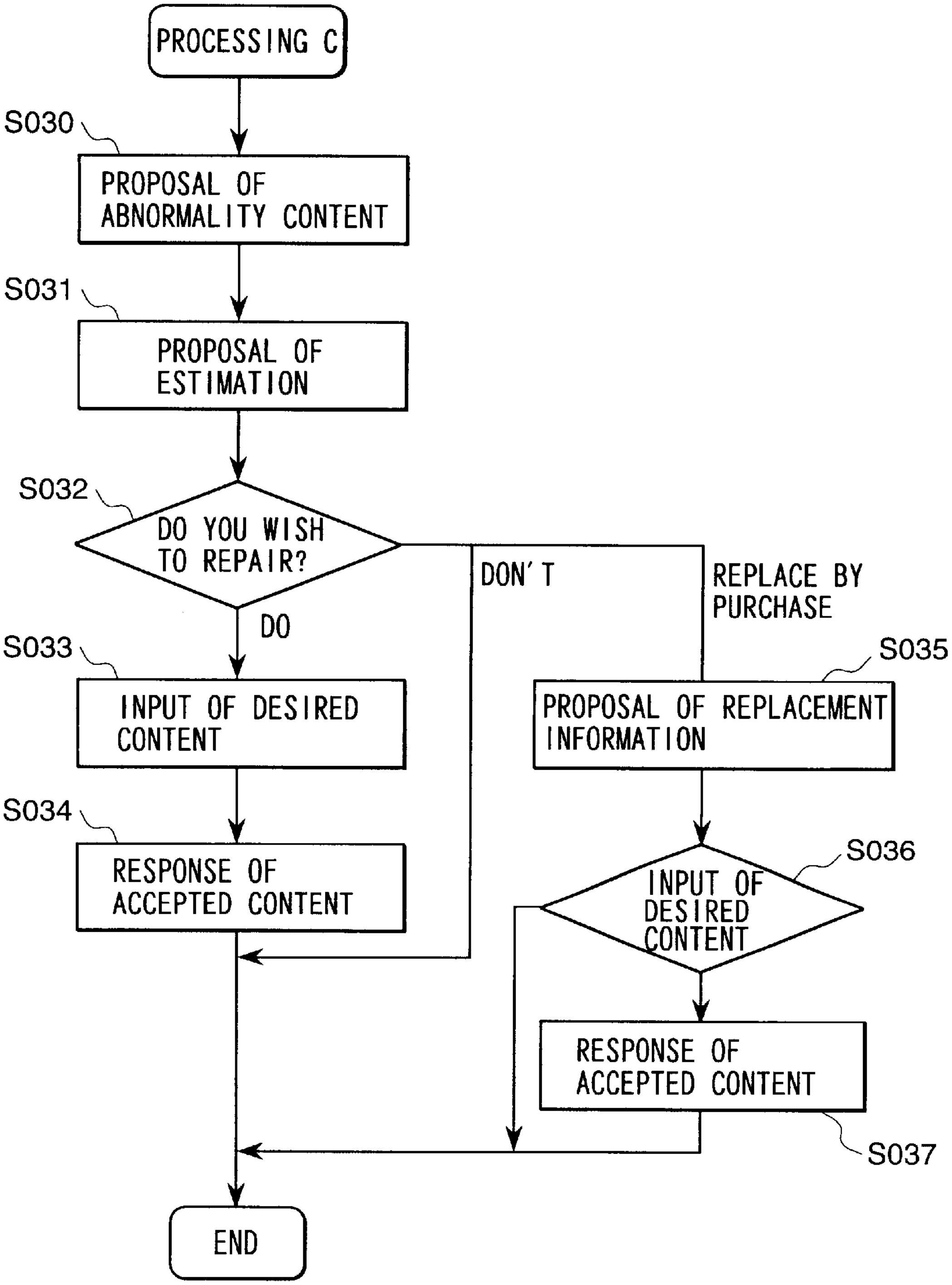
FIG. 9 is a flow chart showing the processing procedure in the embodiment shown in FIG. 2.

Processing C will be explained with reference to FIG. 9. In the processing C, the request for the maintenance service is processed.

The content of the malfunction is presented to user 5 in step S030.

The estimate of cost necessary for the repair is presented to user 5 in step S031.

The selection whether the repair is necessary is demanded to user 5 in step S032. The processing advances from step S032 to step S033 when user 5 desires the repair in step S032. The date and hours of the repair desired by the user are input in step S033. Then, the response of the content of the acceptance is displayed, and processing is completed in step S034.

When user 5 does not desire the repair, processing is ended at once in step S032.

When user 5 desires to replace it in step S032, the information on new products to be bought is presented in step S035. When user 5 inputs and requests the product desired in step S036, the response to the content of the acceptance is displayed, and processing is ended in step S037. Information providing server 3 is notified there is no product desired when user 5 inputs that he does not have the desirable product in step S036, and processing is ended.

Figure 11:
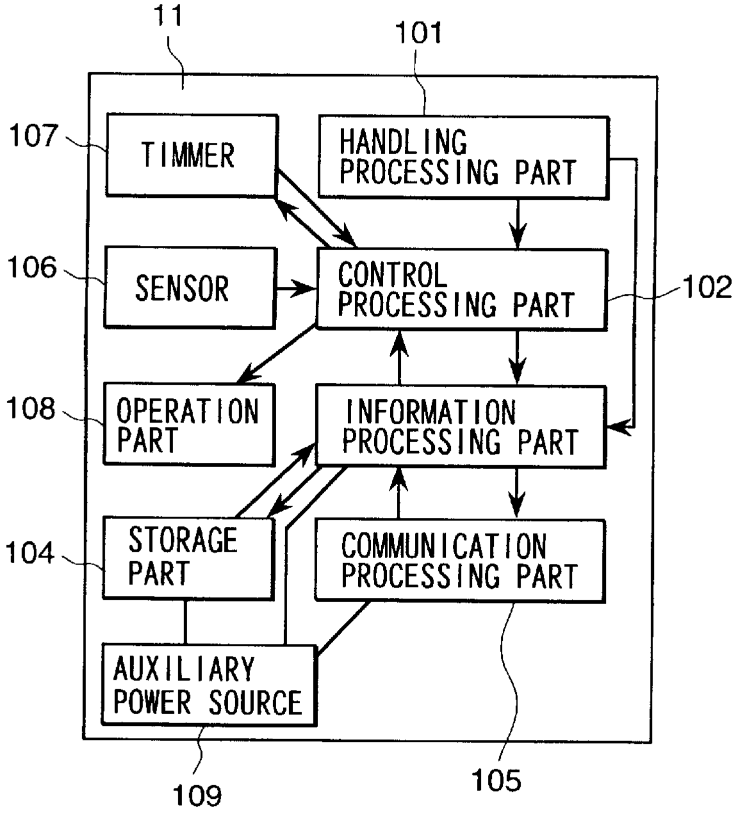
FIG. 11 is a block diagram showing another embodiment of the washing machine in the maintenance service system for home electric appliances of the present invention.

FIG. 11 is a block diagram showing an example of the modification of washing machine 1 according to this embodiment. This modification aims to evade becoming a situation that washing machine 1 cannot communicate with portable terminal 2 by finding the abnormality for instance in the power circuit. The power supply is supplied from standby power supply 109 to information processing part 103, memory part 104, and communication processing part 105 when the malfunction is occurred in the power circuit of washing machine 1, and the information necessary for abnormal diagnosis is immediately transmitted to portable terminal 2. The information for abnormal diagnosis can be protected by evacuating this information to memory part 204 of portable terminal 2.

The abnormal diagnosis program in the each embodiment can be composed as follows. That is, the abnormal diagnosis program is prepared in each home electric appliances, and the portable terminal receives the abnormal diagnosis program from this home electric appliances.

According to such an embodiment, the user for home electric appliances having the portable terminal can ask for the maintenance service on home electric appliances without newly buying the equipment because such an embodiment is provided with the portable terminal which can communicate with the home electric appliances, and the information providing server which can communicate with the portable terminal. Further, it is not required for the maintenance service provider to go to the actual place to diagnose because the user of the home electric appliances can execute the maintenance.

Further, the home electric appliances need not detect the malfunction on business of regular check etc. by assuming the configuration by which the malfunction is notified to the portable terminal at malfunction detection in the maintenance service system for such home electric appliances according to this embodiment.

In the maintenance service system for such home electric appliances according to this embodiment, when the malfunction is notified from the home electric appliances to the portable terminal, or when the operator of the portable terminal requests, the abnormal diagnosis program used in the portable terminal is provided from the information providing server. As a result, the abnormal diagnosis of the home electric appliances is executed, and the result is displayed in the portable terminal. It is possible to take a corrective action to the malfunction of various home electric appliances by using such configuration.

Further, in this embodiment, the abnormal diagnosis program asks the operator of the portable terminal concerning the malfunction judgment of the home electric appliances. The response result from the operator is notified to the information providing server or maintained in the portable terminal. Therefore, even when the malfunction detection means is not installed in home electric appliances, the abnormal diagnosis can be carried out.

Further, in the abnormal diagnosis program of this embodiment, it is not required to operate the home electric appliances again after the user of home electric appliances performs the return processing, by the configuration to transmit the control signal to continue the interrupted processing to the home electric appliances according to the response result from the operator.

Further, when the repair of the home electric appliances is needed by the abnormal diagnosis result of the abnormal diagnosis program, the estimate of the content of the repair and the repair cost is displayed in the portable terminal according to this embodiment. Therefore, the user can know the estimate on the moment before the user who desires the repair of home electric appliances actually asks to repair. As a result, it is possible to judge easily whether or not the user ask to repair.

According to this embodiment, when the estimated amount of said repair cost is larger than the specified value specified by the operator of said portable terminal or the administrator of or said information providing server or the developer of said abnormality diagnosing program, information on buying said home electric appliance can be acquired according to the demand of the operator of said portable terminal. Therefore, the user who desires to replace the home electric appliances does not need to collect again the information on the replacement.

According to this embodiment, by comparing the repair fee and the market value of said home electric appliance with the market value of a new home electric appliance having the similar function to said home electric appliance, information on the buying of said new home electric appliance can be acquired. Therefore, it is possible to determine easily which is better the repair or the replacement.

According to this embodiment, depending upon the result of the abnormality diagnosis by said abnormality diagnosing program, in case where a repair should be needed for said home electric appliance, the date when said home electric appliance is repaired is specified by the operator of said portable terminal and it is notified to said information providing server. Maintenance service provider can make a schedule of the maintenance according to the desire of the user of home electric appliances who desires to repair.

Further, by installing the standby power supply to notify the malfunction of the portable terminal according to this embodiment, it is possible to notify the malfunction even when there is a problem in the power circuit of the home electric appliances.

According to this embodiment, when the failure diagnosis of said home electric appliance is carried out by the failure diagnosis program according to the demand of the operator of said portable terminal, the candidate of a home electric appliance which becomes an object is displayed on said portable terminal, said candidate being selected by priority from the near one to the operator of said portable terminal spatially. Therefore, the user of the home electric appliances who maintains the home electric appliances can easily select the equipment to be maintained.

Further, by composing so as to display the return method in the portable terminal after the malfunction of the home electric appliances is detected according to this embodiment, the user oneself of the home electric appliances can return the home electric appliances from the abnormal state to normal state even if the maintenance service is not provided, Further, by composing so as to acquire the malfunction diagnosis program from the home electric appliances according to this embodiment, the abnormal diagnosis can be performed even when there is no information providing server or it is not possible to communicate with the information providing server.

What is claimed is:

1. A maintenance service system for home electric appliances comprising:

a home electric appliance, a portable terminal which can communicate with said home electric appliance, and an information providing server which can communicate with said portable terminal, wherein said portable terminal, when it is notified of a malfunction from said home electric appliance or the operator of said portable terminal requests, receives an abnormality diagnosing program executed in said portable terminal from said information providing server, and, as a result, executes said abnormality diagnosing of said home electric appliance, whereby the result of the abnormality diagnosing is displayed in the portable terminal.

2. A maintenance service system for home electric appliances according to claim 1 wherein said abnormality diagnosing program carries out a question concerning the malfunction judgment of said home electric appliance to the operator of said portable terminal and notifies the information providing server the response result from said operator or maintains said response result in the said portable terminal.

3. A maintenance service system for home electric appliances according to claim 2 wherein said abnormality diagnosing program, according to the response result from said operator, transmits a control signal to continue the interrupted processing to said home electric appliance.

4. A maintenance service system for home electric appliances according to claim 1 wherein according to the result of the abnormality diagnosing of the abnormality diagnosing program, when repair is needed for said home electric appliance, the estimate of the content of the repair and repair cost is displayed on said portable terminal.

5. A maintenance service system for home electric appliances according to claim 4 wherein, when the estimated amount of said repair cost is larger than the specified value specified by the operator of said portable terminal or the administrator of or said information providing server or the developer of said abnormality diagnosing program, information on buying a substitute appliance can be acquired according to the demand of the operator of said portable terminal.

6. A maintenance service system for home electric appliances according to claim 4 wherein by comparing the repair fee and the market value of said home electric appliance with the market value of a new home electric appliance having the similar function to said home electric appliance, information on the buying of said new home electric appliance can be acquired.

7. A maintenance service system for home electric appliances according to claim 1 wherein depending upon the result of the abnormality diagnosis by said abnormality diagnosing program, in case where a repair should be needed for said home electric appliance, the date when said home electric appliance is repaired is specified by the operator of said portable terminal and it is notified to said information providing server.

8. A maintenance service system for home electric appliances according to claim 1, wherein said home electric appliance has a standby power source as used to notify said portable terminal a malfunction.

9. A maintenance service system for home electric appliances according to claim 1, wherein when the failure diagnosis of said home electric appliance is carried out by the failure diagnosis program according to the demand of the operator of said portable terminal, the candidate of a home electric appliance which becomes an object is displayed on said portable terminal, said candidate being selected by priority from the near one to the operator of said portable terminal spatially.

10. A maintenance service system for home electric appliances according to claim 1, wherein after the malfunction of said home electric appliance is detected, the return method for it is displayed on said portable terminal.

11. A maintenance service system for home electric appliances according to claim 1, wherein said portable terminal receives the failure diagnosis program from said home electric appliance.

* * * * *